(12) United States Patent
Fuchs

(10) Patent No.: US 8,120,363 B2
(45) Date of Patent: Feb. 21, 2012

(54) VOLTAGE DROP COMPENSATION FOR AN ELECTRIC POWER STORAGE DEVICE CHARGING SYSTEM

(75) Inventor: Benjamin S. Fuchs, Andover, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 505 days.

(21) Appl. No.: 12/313,709

(22) Filed: Nov. 24, 2008

(65) Prior Publication Data

US 2010/0127668 A1    May 27, 2010

(51) Int. Cl.
*G01N 27/416* (2006.01)
*H02J 7/00* (2006.01)
*H02J 7/04* (2006.01)

(52) U.S. Cl. .......... 324/426; 320/162; 320/128

(58) Field of Classification Search .......... 324/426; 320/162
See application file for complete search history.

(56) References Cited

U.S. PATENT DOCUMENTS

| | | | |
|---|---|---|---|
| 3,950,688 A * | 4/1976 | Sancey et al. | .......... 320/114 |
| 4,311,920 A | 1/1982 | Smollinger | |
| 4,381,457 A | 4/1983 | Wiles | |
| 4,405,867 A | 9/1983 | Moakler | |
| 4,441,147 A | 4/1984 | Schwarz | |
| 4,604,530 A | 8/1986 | Shibuya | |
| 4,682,262 A | 7/1987 | Monsell | |
| 4,803,459 A | 2/1989 | Ta | |
| 4,918,368 A | 4/1990 | Baker et al. | |
| 5,013,992 A | 5/1991 | Eavenson et al. | |
| 5,157,320 A | 10/1992 | Kuriloff | |
| 5,182,510 A * | 1/1993 | Nakamura | .......... 322/21 |
| 5,198,698 A | 3/1993 | Paul et al. | |
| 5,198,743 A | 3/1993 | McClure et al. | |
| 5,319,298 A | 6/1994 | Wanzong et al. | |
| 5,332,927 A | 7/1994 | Paul et al. | |
| 5,355,075 A | 10/1994 | Wilson, III | |
| 5,371,666 A | 12/1994 | Miller | |
| 5,422,558 A | 6/1995 | Stewart | |
| 5,459,671 A | 10/1995 | Duley | |
| 5,461,263 A | 10/1995 | Helfrich | |
| 5,465,011 A | 11/1995 | Miller et al. | |
| 5,602,462 A | 2/1997 | Stich et al. | |
| 5,608,306 A | 3/1997 | Rybeck et al. | |
| 5,744,962 A | 4/1998 | Alber et al. | |
| 5,966,014 A * | 10/1999 | Zhang et al. | .......... 324/434 |

(Continued)

FOREIGN PATENT DOCUMENTS

DE    195 44 644 A1    6/1996

(Continued)

*Primary Examiner* — M'Baye Diao
(74) *Attorney, Agent, or Firm* — Krieg DeVault LLP; Matthew D. Fair; L. Scott Paynter

(57) ABSTRACT

A system includes an electrical energy storage device that may be in the form of one or more batteries, a charger to selectively charge the electrical energy storage device, and charger cabling sized to electrically interconnect the storage device and the charger together and span a distance separating them. The charger cabling is initially connected across the charger without the storage device to determine information specific to voltage drop caused by the cabling. The system is then reconfigured so that the cabling connects the storage device to the charger for charging. During this charging operation the previously gathered information is used to compensate for the voltage drop along the cabling as the storage device is charged with the charger.

20 Claims, 3 Drawing Sheets

U.S. PATENT DOCUMENTS

| | | |
|---|---|---|
| 5,986,434 A | 11/1999 | Roy et al. |
| 6,005,370 A | 12/1999 | Gustavson et al. |
| 6,040,769 A | 3/2000 | Payne |
| 6,174,253 B1 | 1/2001 | Walter et al. ............ 474/18 |
| 6,177,780 B1 | 1/2001 | Roy et al. |
| 6,715,215 B1 | 1/2001 | Fitzgerald et al. |
| 6,184,659 B1 | 2/2001 | Darmawaskita |
| 6,336,878 B1 | 1/2002 | Ehrlich et al. ............ 474/28 |
| 6,353,306 B1 | 3/2002 | Mixon |
| 6,456,044 B1 | 9/2002 | Darmawaskita |
| 6,479,968 B1 | 11/2002 | Pozsgay et al. |
| 6,502,044 B1 | 12/2002 | Lane et al. |
| 6,724,589 B1 | 4/2004 | Funderburk |
| 6,788,028 B2 | 9/2004 | Lee |
| 6,861,824 B1 | 3/2005 | Liu et al. |
| 6,867,604 B2 | 3/2005 | Haldeman et al. |
| 7,034,414 B1 | 4/2006 | Foerg et al. |
| 7,046,214 B2 | 5/2006 | Ebersole, Jr. et al. |
| 7,123,128 B2 | 10/2006 | Mullet |
| 7,130,248 B1 | 10/2006 | Tsai |
| 7,135,836 B2 | 11/2006 | Kutkut |
| 7,190,266 B2 | 3/2007 | Mullet |
| 7,282,814 B2 | 10/2007 | Jacobs |
| 7,855,655 B2 * | 12/2010 | Hunter et al. ............ 340/664 |
| 2002/0149345 A1 | 10/2002 | Takano et al. |
| 2003/0117112 A1 | 6/2003 | Chen et al. |
| 2003/0155892 A1 | 8/2003 | Poletti |
| 2003/0224833 A1 | 12/2003 | Egan et al. |
| 2005/0083019 A1 | 4/2005 | Green |
| 2006/0170410 A1 | 8/2006 | Bjorn |
| 2006/0220468 A1 * | 10/2006 | Dahl ............ 307/103 |
| 2007/0047100 A1 | 3/2007 | Takahashi et al. |
| 2007/0108951 A1 | 5/2007 | Coleman |
| 2007/0228835 A1 | 10/2007 | Varzhabedian |
| 2008/0315682 A1 * | 12/2008 | Hussain ............ 307/2 |

FOREIGN PATENT DOCUMENTS

| | | |
|---|---|---|
| DE | 198 57 709 A1 | 6/1999 |
| WO | WO92/14292 A1 | 8/1992 |
| WO | WO00/49699 A1 | 8/2000 |
| WO | WO2006/053567 A1 | 5/2006 |

* cited by examiner

VOLTAGE DROP COMPENSATION FOR AN ELECTRIC POWER STORAGE DEVICE CHARGING SYSTEM

BACKGROUND

The present application relates to electrical power, and more particularly, but not exclusively, to charging electrical energy storage devices.

Electrical energy storage devices are used in a variety of applications. In some implementations, these storage devices take the form of an electrochemical battery or bank of such batteries configured with a charger. To accurately control charging current, it is important to determine the battery voltage at the battery terminals. Because the voltage usually differs from one end of the battery cable to the other due to cable impedance, there can be a non-negligible voltage drop along the cable for typical current and voltage levels. Standard battery chargers sometimes address this problem by including separate "sense" lines from the battery terminals to a high impedance voltage monitor circuit in the charger. These sense lines are in addition to the battery cable used to charge the battery. Because the impedance of the voltage monitor is relatively high, negligible current flows through the sense lines and the detected voltage is approximately the same as the actual battery voltage. However, sense lines are susceptible to breakage, and result in a more complex wiring arrangement that can cause reliability problems. Alternatively, some have addressed this problem by oversizing the cabling to reduce its impendence at the penalty of extra cost/weight and potentially less precise operation. Thus, there remains an ongoing demand for further contributions in this area of technology.

SUMMARY

One embodiment of the present invention is a unique charging technique. Other embodiments include unique methods, systems, devices, and apparatus to charge an electric power storage device. Further embodiments, forms, objects, aspects, benefits, features, and advantages of the present invention shall become apparent from the figures and description provided herewith.

DETAILED DESCRIPTION OF REPRESENTATIVE EMBODIMENTS

Figure 1:
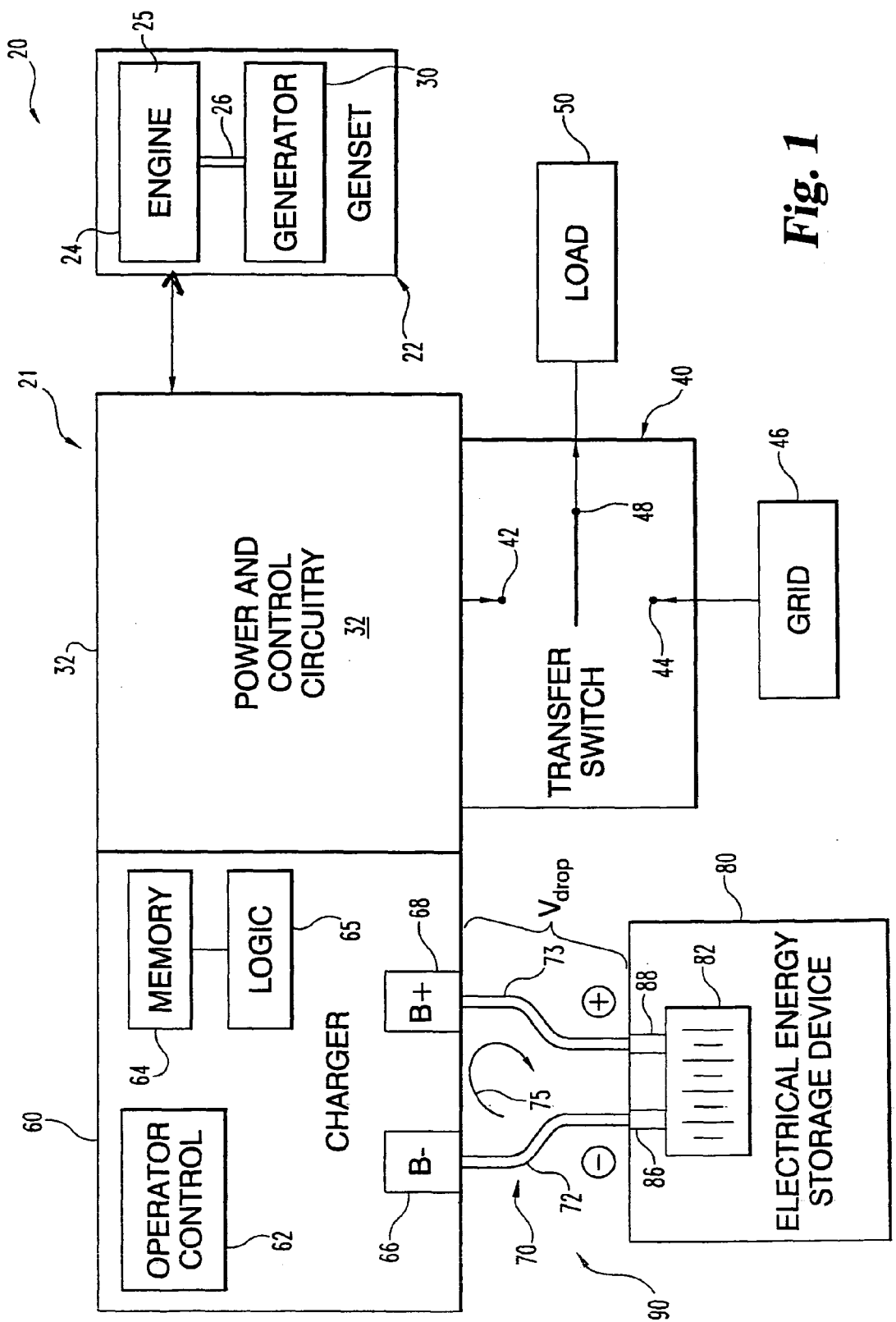
FIG. 1 is a diagrammatic view of an electric power system in a charging configuration.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 depicts electric power system 20 that is alternatively designated auxiliary power system 21. System 21 includes genset 22. Genset 22 includes a prime mover 24 in the form of an internal combustion engine 25 and an electric power generator 30 (such as an alternator) to provide an Alternating Current (AC) output at a target AC voltage and frequency. Engine 24 provides rotational mechanical power to generator 30 with rotary drive mechanism 26. Mechanism 26 can be a direct drive member, a device that provides a nonunity turn ratio, a torque converter, a transmission, and/or a different form of rotary linkage as would occur to those skilled in the art. In one arrangement, engine 24 is of a reciprocating piston type that is diesel fueled. In other forms, engine 24, mechanism 26, and/or generator 30 can be of other types; engine 24 may be differently fueled; and/or a different form of prime mover can be used to provide mechanical power to generator 30 as an alternative or addition to engine 24.

System 20 further includes power and control circuitry 32 coupled to generator 30. In one particular form, engine 24, generator 30, and power circuitry 32 are provided as an integrated subsystem. In other forms, some or all of circuitry 32 may be provided as separate, independent modules, components, and/or units relative to genset 22. Circuitry 32 includes power transfer switch 40, which includes power input 42, and power input 44 electrically coupled to electrical grid 46. Switch 40 further includes power output 48 connected to electrical load 50, and is structured to electrically couple input 42 to load 50 or input 44 to load 50 to alternatively provide power from genset 22 or electrical grid 46. Switch 40 can be of a standard type used in power switching applications, such as emergency power generation systems, stand-by power generation systems, or other types of back-up power sources, as well as other applications that do not involve back-up power sourcing—just to name a few representative examples. In such alternatives, a transfer switch, other power circuitry, and/or grid may be absent.

Circuitry 32 further includes charger 60, electrically coupled to genset 22 and electrical energy storage device 80, to be further described hereinafter. FIG. 1 depicts charging configuration 90 of charger 60 and device 80, in which storage device 80 provides the power needed to start engine 25. However, other applications are envisioned in which storage device 80 may also be used as an emergency backup power source, or as a supplement to the alternating current supplied by genset 22, or for any other application that requires electrical power.

Charger 60 includes operator interface 62, operating logic 65, and memory 64. Operator interface 62 includes one or more of: keypad, switches, or other operator input. Operator interface 62 can also include one or more operator outputs, such as a display, alarm, indicator, or the like. Charger 60 executes operating logic 65 that defines various control, management, and/or regulation functions, and may be in the form of dedicated hardware, such as a hardwired state machine, a controller or processor executing programming instructions, and/or a different form as would occur to those skilled in the art. Operating logic 65 may be comprised of digital circuitry, analog circuitry, or a hybrid combination of both of these types. In one form, it includes a programmable microcontroller or microprocessor, that can include one or more processing units arranged to execute software and/or firmware stored in memory 64.

Memory 64 may comprise one or more types including semiconductor, magnetic, and/or optical varieties, and/or may be of a volatile and/or nonvolatile variety. In one form, memory 64 stores programming instructions of operating logic 65. Alternatively or additionally, memory 64 may store data that is manipulated by operating logic 65. In one arrangement, operating logic 65 and memory 64 are included in a controller/processor form of operating logic 65 that manages and controls operational aspects of genset 22 and/or engine 25, although in other arrangements they may be separate.

Figure 2:
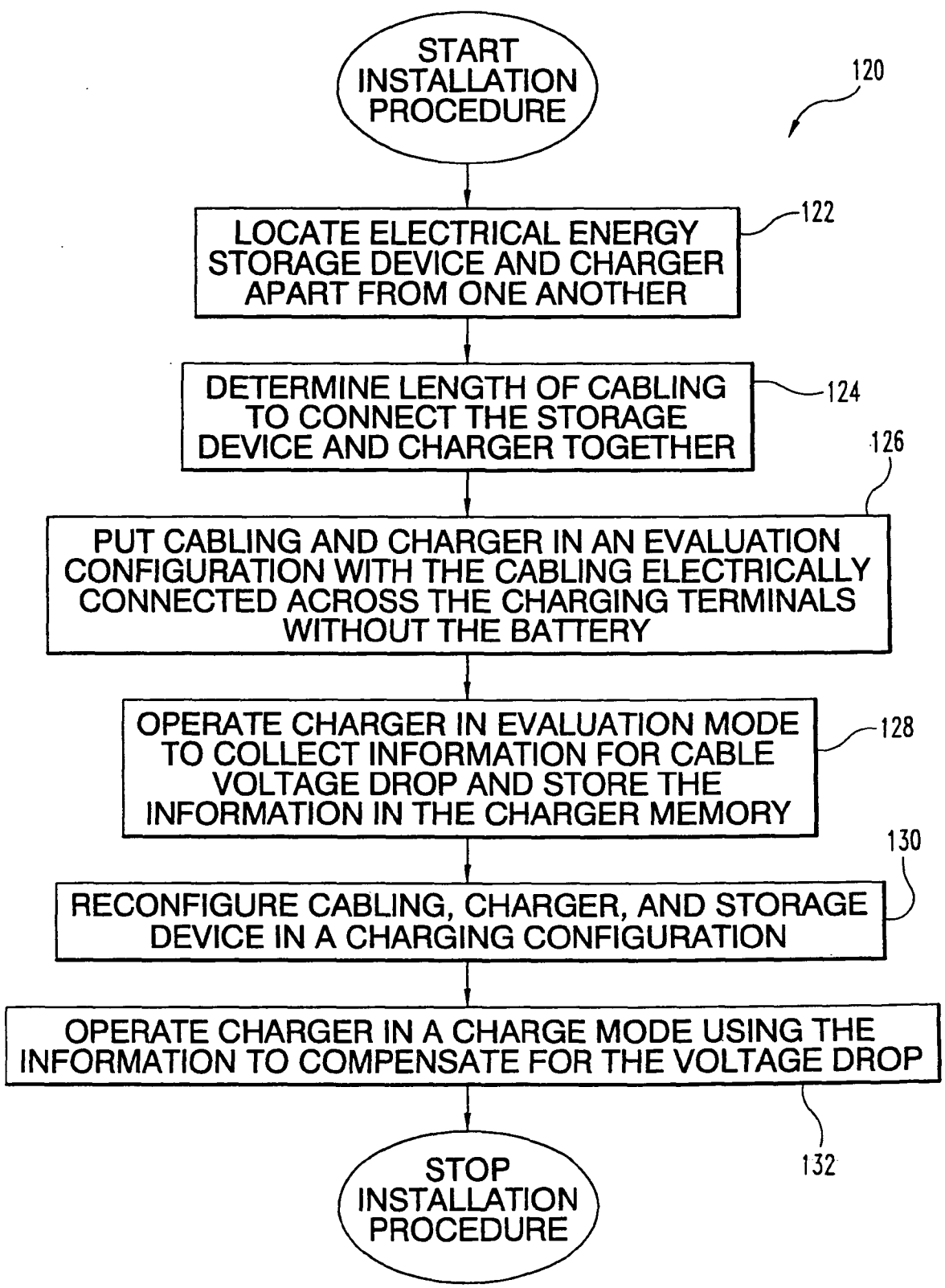
FIG. 2 is a flowchart of one procedure for installing the system of FIG. 1.
Figure 3:
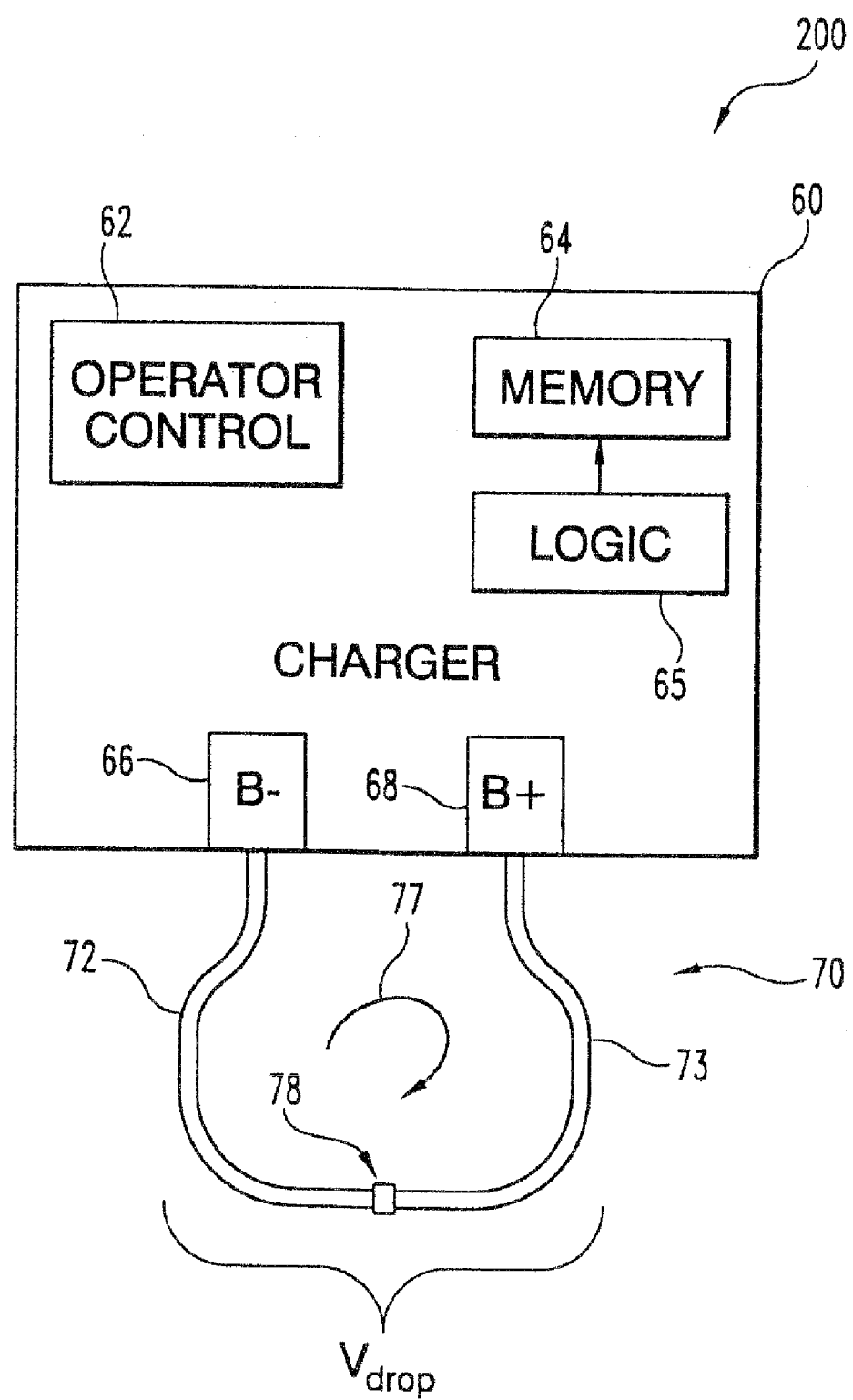
FIG. 3 is a partial, diagrammatic view of the charger and cabling of the system of FIG. 1 in an evaluation configuration.

Charger 60 is capable of supplying more than one level of electric current to a device connected between terminal 66 and terminal 68. Charger 60 is electrically coupled by cabling 70 to electrical energy storage device 80, which includes one or more electrochemical batteries 82. Battery 82 includes battery terminal 86, which is electrically coupled by electrical conductor 72 to terminal 66. Battery 82 further includes battery terminal 88, which is electrically coupled by electrical conductor 73 to terminal 68. When cabling 70 is conducting charging current 75, the resistance of conductor 72 and 73 causes a voltage drop across each. FIG. 2 illustrates procedure 120 in flowchart form, which is one technique for installing and operating system 20 of FIG. 1; where like reference numerals refer to like features previously described. Procedure 120 begins with operation 122, which includes locating electrical energy storage device 80 and charger 60 apart from one another. Such separation may be desired to provide a controlled environment for battery 82 (such as temperature range control offered by indoor placement), while positioning genset 22 in a less controlled environment (such as outdoors) that is more acceptable given the noise, exhaust, or the like, resulting from genset operation. After execution of operation 122, procedure 120 continues with operation 124, which includes determining the length of cabling 70 to connect together storage device 80 and charger 60. After execution of operation 124, procedure 120 continues with operation 126, which includes putting cabling 70 and charger 60 in an evaluation configuration 200, as shown in FIG. 3, in which storage device 80 is not connected to cabling 70, and conductor 72 is connected in series with conductor 73 between terminal 66 and terminal 68. FIG. 3 depicts a partial diagrammatic view of charger 60 and cabling 70 of FIG. 1 in an evaluation configuration 200 in which conductor 72 and conductor 73 are connected in series using shorting connector 78, and storage device 80 is disconnected.

After execution of operation 126, procedure 120 continues with operation 128, which includes operating charger 60 in an evaluation mode. The evaluation mode includes supplying a predefined electrical current through cabling 70 and determining voltage drop, Vdrop, across terminal 66 and terminal 68 of charger 60 while in the evaluation configuration 200. It should be appreciated that in alternative embodiments, a known resistance could be connected in series with conductor 72 and 73 to determine a value from which Vdrop (voltage drop) could be calculated for the cabling 70 alone. Such an arrangement might be used to limit current magnitude. In a further alternative, for conductors of approximately equal length, the voltage drop across just one of conductors 72 or 73 could be measured, and then doubled to determine Vdrop through cabling 70. Likewise, Vdrop could be calculated by applying a known current to a parallel configuration of conductors 72 and 73 and determining Vdrop from voltage across such configuration with each conductor 72 and 73 being considered of equal electrical resistance. Operation 128 further includes storing the value of Vdrop in memory 64 of charger 60.

After execution of operation 128, procedure 120 continues with operation 130, which includes reconfiguring charger 60, cabling 70, and storage device 80 in a charging configuration 90 as shown in FIG. 1. After execution of operation 130, procedure 120 continues with operation 132, which includes operating charger 60 in a charge mode using the stored value of Vdrop to change the charging current, the charging voltage, or both to compensate for the voltage drop Vdrop in cabling 70 while storage device 80 is being charged. After execution of operation 132, procedure 120 stops.

It should be appreciated that in at least some embodiments, charger 60 includes fault detection to prevent application of the electrical current used during the evaluation mode while storage device 80 is still connected to cabling 70. Alternatively or additionally, charger 60 includes fault detection responsive to a Vdrop value that exceeds a maximum threshold. Such fault detection can be defined in whole or in part by operating logic 65. Any of faults detected by charger 60 can be reported to a user via operator interface 62.

Many further embodiments of the present application are envisioned. For example, one further embodiment includes: selecting a first location for an electrical energy storage device and a second location for a charging device that is spaced apart from the first location; selecting one or more electrical conductors to extend between the first location and the second location; configuring the one or more electrical conductors and the charging device in an evaluation configuration; while in this configuration, flowing an evaluation electric current through the one or more electrical conductors from the charging device to determine information to account for voltage drop through the one or more electrical conductors; reconfiguring the one or more electrical conductors to connect the electrical energy storage device and the charging device together in a charging configuration; and while in the charging configuration flowing a charging current from the charging device through the one or more conductors in the electrical energy storage device and compensating for the voltage drop through the one or more electrical conductors with the charging device based on the information.

In one nonlimiting form, the present application facilitates more cost effective wiring selection criteria compared to conventional approaches in which the wiring between the charger and the batteries had to be gauged such that the voltage drop on the wire was limited to a maximum of 1.5 Volts. Such requirements resulted in much larger gauge wires when runs were long—unlike the present application. In fact, for such forms of the present application one wire gauge can be used for many different run sizes compared to these conventional approaches—given that the charger adjusts to account for voltage drop determined during the evaluation mode.

In another example, an additional embodiment of the present application comprises: an electrical energy storage device and a charging device spaced apart from one another in different locations, one or more electrical conductors extending between these locations, means for configuring the one or more electrical conductors and the charging device in an evaluation configuration, means for flowing an evaluation electric current through the one or more electrical conductors from the charging device to determine information to account for voltage drop through the one or more electrical conductors while in the evaluation configuration, means for reconfiguring the one or more electrical conductors to connect the electrical energy storage device and the charging device together in a charging configuration, means for flowing a charging current from the charging device to the one or more conductors and the electrical energy storage device, and means for contemplating for the voltage drop through the one or more electrical conductors with the charging device based on the information while in the charging configuration.

A further embodiment comprises: providing an electrical power generation system including an electrical energy storage device at a first location and a charger at a second location separated from the first location; sizing the cabling to extend between the electrical energy storage device at the first location and the charger at the second location; flowing an electric current through the cabling to determine information to account for voltage drop along the cabling; electrically connecting the electrical energy storage device and the charger with the cabling; charging the electrical energy storage device by providing a second electric current from the charger through the cabling in the electrical energy storage device; and compensating for the voltage drop through the cabling with the charger in accordance with the information during the charging of the electrical energy storage device.

In yet another embodiment, a system comprises an electrical energy storage device; a charger to selectively charge the electrical energy storage device; charger cabling sized to selectively connect the electrical energy storage device and the charger together and span a distance separating the electrical energy storage device and the charger; and the charger including operating logic to selectively operate the charger in: (a) an evaluation mode to provide an evaluation electric current through the charger cabling and not the electrical energy storage device to determine information to account for voltage drop along the charger cabling and store the information in the charger and (b) a charge mode to provide a charging current from the charging device through the cabling and the electrical energy storage device and compensate for the voltage drop through the cabling in accordance with the information.

In the further embodiment, a system comprises: one or more batteries; a battery charger; charger cabling sized to electrically connect the one or more batteries and the charger together; and the charger including means for providing an evaluation electric current through the charger cabling and not the one or more batteries to determine information to account for voltage drop along the charger cabling, means for storing the information in the charger, means for charging one or more batteries through the charger cabling, and means for compensating for voltage drop through the charger cabling in accordance with the information.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:

selecting a first location for an electrical energy storage device and a second location for a charging device, the first location being spaced apart from the second location;

selecting one or more electrical conductors to extend between the first location and the second location;

configuring the one or more electrical conductors and the charging device in an evaluation configuration;

while in the evaluation configuration, flowing an evaluation electric current through the one or more electrical conductors from the charging device to determine information to account for voltage drop through the one or more electrical conductors;

reconfiguring the one or more electrical conductors to connect the electrical energy storage device and the charging device together in a charging configuration; and while in the charging configuration, flowing a charging current from the charging device through the one or more conductors and the electrical energy storage device and compensating for the voltage drop through the one or more electrical conductors with the charging device based on the information.

2. The method of claim 1, wherein the flowing including controlling the evaluation electric current with the charging device and determining the voltage drop across the one or more electrical conductors.

3. The method of claim 1, wherein the electrical energy storage device includes a battery, the one or more electrical conductors includes two or more conductors, the two or more conductors are electrically connected in series between a first charger terminal and a second charger terminal of the charging device in the evaluation configuration without the electrical energy storage device being connected in series therewith, the battery includes a first battery terminal and a second battery terminal, and a first one of the two or more conductors is connected between the first charger terminal of the charging device and the first battery terminal and a second one of the two or more conductors is connected between the second charger terminal of the charging device and the second battery terminal in the charging configuration.

4. The method of claim 1, which includes storing the information in the charging device.

5. The method of claim 1, wherein the electrical energy storage device is not electrically connected to receive the evaluation electric current through the one or more electrical conductors while the charging device and the one or more conductors are in the evaluation configuration.

6. The method of claim 1, which includes:

providing an electric power generator connected to the charging device;

electrically powering the charging device with the electric power generator; and driving the electric power generator with an internal combustion engine.

7. The method of claim 6, wherein:

the electrical energy storage device includes one or more batteries;

the one or more batteries, the one or more conductors, the charging device, the electric power generator, and the internal combustion engine are included in an auxiliary power generation system; and the auxiliary power generation system further includes a transfer switch, the transfer switch including a first selectable power input connected to the auxiliary power generation system, a second selectable power input connected to an electric power grid, and an electric power output connected to an electric load.

8. A method, comprising:
- providing an electric power generation system including an electrical energy storage device at a first location and a charger at a second location separated from the first location;
- sizing cabling to extend between the electrical energy storage device at the first location and the charger at the second location;
- flowing a first electric current through the cabling to determine information to account for voltage drop along the cabling;
- electrically connecting the electrical energy storage device and the charger with the cabling;
- charging the electrical energy storage device by providing a second electric current from the charger through the cabling and the electrical energy storage device; and
- during the charging, compensating for the voltage drop through the cabling with the charger in accordance with the information.

9. The method of claim 8, which includes:
- connecting the cabling across a first charging terminal of the charger and a second charging terminal of the charger to provide an evaluation configuration;
- operating the charger in an evaluation mode to provide the first electric current through the cabling while in the evaluation configuration; and
- configuring the evaluation configuration so that the first electric current does not flow through the electrical energy storage device.

10. The method of claim 8, wherein the electrical energy storage device includes one or more electrochemical batteries and cabling is one of: an insulated single strand wire of no more than 10 AWG and multistrand wiring of no more than 10 AWG.

11. The method of claim 8, wherein the electric power generation system includes a transfer switch, and further comprising electrically connecting the charger to the transfer switch.

12. The method of claim 11, wherein the transfer switch includes an electric power output, a first input connected to the charger, and a second power input connected to an electric power grid.

13. The method of claim 8, which includes storing the information in the charger.

14. A system, comprising:
- an electrical energy storage device;
- a charger to selectively charge the electrical energy storage device;
- charger cabling sized to electrically connect the electrical energy storage device and the charger together and span a distance separating the electrical energy storage device and the charger; and
- the charger including operating logic to selectively operate the charger in: (a) an evaluation mode to provide an evaluation electric current through the charger cabling and not the electrical energy storage device to determine information to account for voltage drop along the charger cabling and store the information in the charger and (b) a charge mode to provide a charging current from the charging device through the cabling and the electrical energy storage device and compensate for the voltage drop through the cabling in accordance with the information.

15. The system of claim 14, wherein the electrical energy storage device includes one or more electrochemical batteries.

16. The system of claim 15, further comprising:
- a genset including an alternator and an internal combustion engine structure to drive the alternator; and
- power circuitry electrically connected to the alternator and the charger.

17. The system of claim 16, further comprising a transfer switch including a first power input, a second power input, and a power output, the first power input being connected to the power circuitry to receive electricity therefrom.

18. The system of claim 17, wherein:
- the charger includes means for selecting between the evaluation mode and the charge mode; and
- the transfer switch includes means for selectively connecting the first power input or the second power input to the power output.

19. The system of claim 16, further comprising:
- means for converting mechanical power to electric power for the charger; and
- means for providing mechanical power to the converting means.

20. A system, comprising:
- one or more batteries;
- battery charger circuitry;
- charger cabling sized to electrically connect the one or more batteries and the charger together; and
- wherein the charger circuitry includes: means for providing an evaluation electric current through the charger cabling and not the one or more batteries to determine information to account for voltage drop along the charger cabling, means for storing the information in the charger, means for charging the one or more batteries through the charger cabling, and means for compensating for the voltage drop through the charger cabling in accordance with the information.

* * * * *